US012391519B2

(12) United States Patent
Tang et al.

(10) Patent No.: US 12,391,519 B2
(45) Date of Patent: Aug. 19, 2025

(54) GUIDANCE ON SAFETY INSPECTION OPERATIONS OF FUNCTIONAL COMPONENT OF ELEVATOR SYSTEM

(71) Applicant: Otis Elevator Company, Farmington, CT (US)

(72) Inventors: Xiaobin Tang, Tianjin (CN); Weiwei Xing, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1319 days.

(21) Appl. No.: 17/093,056

(22) Filed: Nov. 9, 2020

(65) Prior Publication Data

US 2021/0221643 A1  Jul. 22, 2021

(30) Foreign Application Priority Data

Jan. 20, 2020  (CN) .......................... 202010066623.4

(51) Int. Cl.
*B66B 5/00* (2006.01)
*B66B 1/34* (2006.01)
(Continued)

(52) U.S. Cl.
CPC .......... *B66B 5/0087* (2013.01); *B66B 1/3461* (2013.01); *B66B 5/0031* (2013.01);
(Continued)

(58) Field of Classification Search
CPC ... B66B 5/0087; B66B 1/3461; B66B 5/0031; B66B 5/0093; H04W 4/80; H04W 76/10
(Continued)

(56) References Cited

U.S. PATENT DOCUMENTS 12,162,724 B2 * 12/2024 Roth ....................... B66B 1/463
2018/0141780 A1 * 5/2018 Franck .................. B66B 5/0087
2019/0300336 A1 * 10/2019 Witczak .................. B66B 1/468

FOREIGN PATENT DOCUMENTS

CN      109928280 A     6/2019
WO    2017103320 A1     6/2017

OTHER PUBLICATIONS

Witczak et al. (CN 110304499 A)Starting The Automatic Elevator Maintenance Mode (Year: 2019).*
(Continued)

*Primary Examiner* — Jorge L Carrasquillo
(74) *Attorney, Agent, or Firm* — CANTOR COLBURN LLP

(57) ABSTRACT

An apparatus for guiding a maintenance individual to perform a safety checking operation on a functional component of an elevator system includes: a wireless signal component connected with the elevator controller of the elevator system and establishing a wireless communication connection with the mobile terminal carried by the maintenance individual to enter the elevator hoistway for maintenance operation by broadcasting wireless signal; the apparatus configured to perform information interaction about the functional component by a wireless communication module of the mobile terminal and the elevator controller, and to provide safety checking guidance information for guiding the maintenance individual to complete the safety checking operation by a safety checking guidance module of the mobile terminal.

27 Claims, 5 Drawing Sheets

(51) Int. Cl.
*H04W 4/80* (2018.01)
*H04W 76/10* (2018.01)

(52) U.S. Cl.
CPC ............. *B66B 5/0093* (2013.01); *H04W 4/80* (2018.02); *H04W 76/10* (2018.02)

(58) Field of Classification Search
USPC ........................................................ 187/393
See application file for complete search history.

(56) References Cited

OTHER PUBLICATIONS

Tsuchimoto (JP 2017024871 A) Elevator System (Year: 2017).*
Partanen (WO 2017103320 A1) Condition-Based Monitoring of Elevator (Year: 2017).*
European Search Report for Application No. 20214922.5; Issued Jun. 29, 2021; 7 Pages.
Chinese Office Action for Application No. 202010066623.4, Issued Mar. 19, 2024, 10 Pages.

* cited by examiner

GUIDANCE ON SAFETY INSPECTION OPERATIONS OF FUNCTIONAL COMPONENT OF ELEVATOR SYSTEM

CROSS-REFERENCE TO RELATED APPLICATION

This application claims priority from Chinese patent application No.202010066623.4, filed on Jan. 20, 2020, the entirety of which is hereby incorporated by reference herein and forms a part of the specification.

FIELD OF THE INVENTION

The invention belongs to the technical field of Elevator and relates to the maintenance of elevators, in particular to an apparatus and method for guiding maintenance individuals to perform safety checking operation on functional components of an elevator system, an elevator system comprising the apparatus, and a computer readable storage medium and a mobile terminal capable of realizing the method.

BACKGROUND OF THE INVENTION

The installation and application of elevator are increasingly widespread in various buildings, and elevator maintenance work is very important for safe operation of elevators and, therefore, there is a corresponding industry standard to specify maintenance operation procedure for various elevators.

Elevator maintenance operations include maintenance operations that require maintenance individual to enter an elevator hoistway, e.g. maintenance operations performed by a maintenance individual on the car roof or at a pit of an elevator hoistway, which are relatively very dangerous. To ensure the safety of the maintenance individual, corresponding safety checking operation procedures (e.g., WWWJSS) are established corresponding to the maintenance operation in the elevator hoistway, maintenance individuals are required to strictly perform the safety checking operation regulated by the safety checking operation procedures manually before performing maintenance operations in the elevator hoistway.

However, manual execution of these safety checking operations relies heavily on operation standardization of maintenance individuals, manual operating levels, etc., which subject to many random factors, being time-consuming and laborious.

SUMMARY OF THE INVENTION

According to a first aspect of the present disclosure, there is provided an apparatus for guiding a maintenance individual to perform a safety checking operation on a functional component of an elevator system, comprising: a wireless signal component connected with an elevator controller of the elevator system and establishing a wireless communication connection with a mobile terminal carried by the maintenance individual to enter an elevator hoistway for maintenance operation by broadcasting a wireless signal: wherein the apparatus is configured to perform an information interaction about the functional component by a wireless communication module of the mobile terminal and the elevator controller, and to provide safety checking guidance information for guiding the maintenance individual to complete the safety checking operation by a safety checking guidance module of the mobile terminal.

The apparatus according to one embodiment of the present disclosure, further comprising: the elevator controller comprising: an information acquisition module for acquiring, in response to a state switching operation on the functional component, first information for determining whether the functional component passes a corresponding safety checking operation in real time; the apparatus is further configured to perform the following actions by the safety checking guidance module of the mobile terminal: generating first safety checking guidance information for guiding the maintenance individual to perform the state switching operation on the functional component, and generating, based on the first information, second safety checking guidance information indicating whether the functional component passes the safety checking operation; wherein the safety checking guidance information provided includes the first safety checking guidance information and the second safety checking guidance information, the information interaction including an interaction of the first information.

The apparatus according to yet another embodiment or any of the above embodiments of the present disclosure, further comprising: the elevator controller comprising: an information acquisition module for acquiring, in response to a state switching operation on the functional component, first information for determining whether the functional component passes a corresponding safety checking operation in real time; a second safety checking guiding information generation module for generating, based on the first information, second safety checking guiding information indicating whether the functional component passes the safety checking operation; the apparatus is further configured to generate, by a safety checking guidance module of the mobile terminal, first safety checking guidance information for guiding the maintenance individual to perform the state switching operation on the functional component; wherein the safety checking guidance information provided includes the first safety checking guidance information and the second safety checking guidance information, the information interaction including an interaction of the second safety checking guidance information.

The apparatus according to yet another embodiment or any of the above embodiments of the present disclosure, wherein the elevator controller is configured to, in response to a first instruction transmitted from the mobile terminal, control a car to move to a position suitable for the maintenance individual to enter a pit of the elevator hoistway or to enter a car roof of the car.

The apparatus according to yet another embodiment or any of the above embodiments of the present disclosure, wherein the elevator controller is configured to operate in a hoistway maintenance control mode in response to a second instruction transmitted from the mobile terminal: wherein the elevator controller at least does not respond to a passenger's calling instruction in the hoistway maintenance control mode and can acquire the first information in real time.

The apparatus according to yet another embodiment or any of the above embodiments of the present disclosure, wherein the apparatus is configured to present the safety checking guidance information to the maintenance individual in the form of a sound and/or a user interface by an information presentation module of the mobile terminal.

The apparatus according to yet another embodiment or any of the above embodiments of the present disclosure, further comprising:

a safety checking determination sub-module disposed in the elevator controller or the mobile terminal for determining, based on the first information, whether a corresponding functional component passes the safety checking operation, wherein the first information includes a current state of the functional component and position change information corresponding to a car in the current state.

The apparatus according to yet another embodiment or any of the above embodiments of the present disclosure, wherein the apparatus is further configured to: with determining that currently the functional component passes the safety checking operation, further provide safety checking guidance information for guiding the maintenance individual to complete the safety checking operation of yet another functional component using a safety checking guidance module of the mobile terminal based on a predefined safety checking operation procedure, if it is determined.

The apparatus according to yet another embodiment or any of the above embodiments of the present disclosure, wherein the maintenance operation comprises a maintenance operation performed on a car roof of the car, the functional components requiring the safety checking operation correspondingly include a door lock switch, a car roof e-stop switch, and/or a car roof inspection switch; accordingly, the safety checking guidance information provided includes: information for guiding the maintenance individual to complete the safety checking operation for the door lock switch, information for guiding the maintenance individual to complete the safety checking operation for the car roof e-stop switch, and/or information for guiding the maintenance individual to complete the safety checking operation for the car roof inspection switch.

The apparatus according to yet another embodiment or any of the above embodiments of the present disclosure, wherein the maintenance operation comprises a maintenance operation performed in the pit of the elevator hoistway, the functional components requiring the safety checking operation correspondingly include a door lock switch, an upper e-stop switch disposed at the pit, and/or a lower e-stop switch disposed at the pit; accordingly, the safety checking guidance information provided includes: information for guiding the maintenance individual to complete the safety checking operation for the door lock switch, information for guiding the maintenance individual to complete the safety checking operation for the upper e-stop switch, and/or information for guiding the maintenance individual to complete the safety checking operation for the lower e-stop switch.

The apparatus according to yet another embodiment or any of the above embodiments of the present disclosure, wherein the wireless signal component is a Bluetooth module or a Bluetooth Low Energy module.

The apparatus according to yet another embodiment or any of the above embodiments of the present disclosure, wherein the apparatus is further configured to comprise: an electronic safety control module that automatically completes the state switching operation on the functional component currently under a safety checking in response to the first safety checking guidance information.

The apparatus according to yet another embodiment or any of the above embodiments of the present disclosure, wherein the apparatus further comprises: a wireless communication module of the mobile terminal for establishing the wireless communication connection with the wireless signal component, and performing the information interaction about the function component with the elevator controller; a safety checking guiding module of the mobile terminal for providing safety checking guiding information for guiding the maintenance individual to complete the safety checking operation.

According to a second aspect of the present disclosure, there is provided an elevator system comprising a car and an elevator controller for controlling the car to move in an elevator hoistway, further comprising: an apparatus for guiding a maintenance individual to perform a safety checking operation on a functional component of an elevator system according to any of the apparatus described above.

According to a third aspect of the present disclosure, there is provided A method for guiding a maintenance individual to perform a safety checking operation on a functional component of an elevator system, comprising the steps of: establishing, by an elevator controller, a communication connection with a mobile terminal carried by the maintenance individual to enter an elevator hoistway for a maintenance operation by means of a wireless signal component in the elevator system; performing an information interaction about the functional component between the mobile terminal and the elevator controller; and providing, by means of the mobile terminal, safety checking guidance information for guiding the maintenance individual to complete the safety checking operation.

The method according to one embodiment of the present disclosure, further comprising the steps of: acquiring, by the elevator controller in real time, first information for determining whether the functional component passes a corresponding safety checking operation in response to a state switching operation on the functional component; the step of providing safety checking guidance information includes the steps of: generating, by means of the mobile terminal, first safety checking guiding information for guiding the maintenance individual to perform the state switching operation on the functional component; and generating, by means of the mobile terminal based on the first information, second safety checking guidance information for determining whether the functional component passes the safety checking operation; wherein the safety checking guidance information provided includes the first safety checking guidance information and the second safety checking guidance information, the information interaction including an interaction of the first information.

The method according to yet another embodiment or any of the above embodiments of the present disclosure, further comprising the steps of: acquiring, by the elevator controller in real time, first information for determining whether the functional component passes a corresponding safety checking operation in response to a state switching operation on the functional component; and generating, by the elevator controller based on the first information, second safety checking guidance information indicating whether the functional component passes the safety checking operation; the step of providing safety checking guidance information includes the steps of: generating, by means of the mobile terminal, first safety checking guiding information for guiding the maintenance individual to perform the state switching operation on the functional component; wherein the safety checking guidance information provided includes the first safety checking guidance information and the second safety checking guidance information, the information interaction including an interaction of the second safety checking guidance information.

The method according to yet another embodiment or any of the above embodiments of the present disclosure, further comprising the steps of: controlling the car to move to a position suitable for the maintaining individual to enter a pit of the elevator hoistway or to enter a car roof of the car in response to the first instruction transmitted from the mobile terminal.

The method according to yet another embodiment or any of the above embodiments of the present disclosure, further comprising: with determining that currently the functional component passes the safety checking operation, further providing safety checking guidance information for guiding the maintenance individual to complete the safety checking operation of yet another functional component by means of the mobile terminal based on a predefined safety checking operation procedure. The method according to yet another embodiment or any of the above embodiments of the present disclosure, further comprising the steps of: automatically completing, by an electronic safety control module, a state switching operation on the functional component currently under a safety checking in response to the first safety checking guidance information.

According to a fourth aspect of the present disclosure, there is provided A method for guiding a maintenance individual to perform a safety checking operation on a functional component of an elevator system, comprising the steps of: establishing a wireless communication connection with a wireless signal component connected with an elevator controller of the elevator system, and performing an information interaction about the functional component with the elevator controller; and providing safety checking guidance information for guiding the maintenance individual to complete the safety checking operation.

The method according to one embodiment of the present disclosure, wherein the step of providing the safety checking guidance information comprises: generating first safety checking guiding information for guiding the maintenance individual to perform the state switching operation on the functional component.

The method according to yet another embodiment or any of the above embodiments of the present disclosure, further comprising the steps of: receiving first information from the elevator controller for determining whether the functional component passes a corresponding safety checking operation; the step of providing the safety checking guidance information further comprises the steps of: generating, based on the first information, second safety checking guidance information indicating whether the functional component passes the safety checking operation; wherein the safety checking guidance information provided includes the first safety checking guidance information and the second safety checking guidance information.

The method according to yet another embodiment or any of the above embodiments of the present disclosure, further comprising the steps of: transmitting a first instruction to the elevator controller, wherein the first instruction is used for triggering the elevator controller to control the car to move to a position suitable for the maintenance individual to enter a pit of the elevator hoistway or to enter a car roof of the car.

The method according to yet another embodiment or any of the above embodiments of the present disclosure, further comprising the steps of: presenting the safety checking guidance information in the form of a sound and/or a user interface.

The method according to yet another embodiment or any of the above embodiments of the present disclosure, further comprising the steps of: transmitting, to the elevator controller, a second instruction to trigger the elevator controller to enter or exit a hoistway maintenance control mode in response to an input of the maintenance individual; wherein the elevator controller at least does not respond to the passenger's calling instruction in a hoistway maintenance control mode and can acquire first information for determining whether the functional component passes a checking of a corresponding safety check in real time.

The method according to yet another embodiment or any of the above embodiments of the present disclosure, further comprising the steps of: determining whether a corresponding functional component passes a safety checking operation based on the first information, wherein the first information includes a current state of the functional component and position change information corresponding to a car in the current state.

The method according to yet another embodiment or any of the above embodiments of the present disclosure, further comprising the steps of: with determining that the functional component passes the safety checking operation, further providing, based on a predefined safety checking operation procedure, safety checking guidance information for guiding the maintenance individual to complete the safety checking operation of yet another functional component.

The method according to yet another embodiment or any of the above embodiments of the present disclosure, wherein a maintenance operation of the maintenance individual comprises the maintenance operation performed on a car roof of the car, the functional components requiring the safety checking operation correspondingly include a door lock switch, a car roof e-stop switch, and/or a car roof inspection switch; accordingly, the safety checking guidance information provided includes: information for guiding the maintenance individual to complete the safety checking operation for the door lock switch, information for guiding the maintenance individual to complete the safety checking operation for the car roof e-stop switch, and/or information for guiding the maintenance individual to complete the safety checking operation for the car roof inspection switch.

The method according to yet another embodiment or any of the above embodiments of the present disclosure, wherein a maintenance operation of the maintenance individual comprises the maintenance operation performed in a pit of an elevator hoistway, the functional components requiring the safety checking operation correspondingly include a door lock switch, an upper e-stop switch disposed at the pit, and/or a lower e-stop switch disposed at the pit; accordingly, the safety checking guidance information provided includes: information for guiding the maintenance individual to complete the safety checking operation for the door lock switch, information for guiding the maintenance individual to complete the safety checking operation for the upper e-stop switch, and/or information for guiding the maintenance individual to complete the safety checking operation for the lower e-stop switch.

The method according to yet another embodiment or any of the above embodiments of the present disclosure, wherein the established wireless communication connection is a Bluetooth connection or a Bluetooth Low Energy connection.

According to a fifth aspect of the present disclosure, there is provided a computer readable storage medium having stored thereon a computer program, wherein the program is executed by a processor to implement the steps of any of the methods described above for guiding a maintenance individual to perform a safety checking operation on a functional component of an elevator system.

According to a sixth aspect of the present disclosure, there is provided a mobile terminal for guiding a maintenance individual to perform a safety checking operation on a functional component of an elevator system, comprising a memory, a processor, and a computer program stored on the memory and executable on the processor, wherein when the program is executed by the processor, the steps of any of the methods described above for guiding a maintenance individual to perform a safety checking operation on a functional component of an elevator system are implemented.

The above features and operations of the present invention will become more apparent from the following description and the accompanying drawings.

BRIEF DESCRIPTION OF THE DRAWINGS

The above and other objects and advantages of the present invention will become more complete and clear from the following detailed description taken in conjunction with the drawings, wherein like or similar elements are designated by like numerals.

DETAILED DESCRIPTION OF THE EMBODIMENT(S) OF THE INVENTION

The present invention will now be described more fully with reference to the accompanying drawings, in which exemplary embodiments of the present invention are shown. This invention may, however, be implemented in many different forms and should not be construed as limited to the embodiments set forth herein. Rather, these embodiments are provided so that this disclosure will become thorough and complete, and the concept of the present invention will be fully conveyed to those skilled in the art.

Some block diagrams shown in the figures are functional entities and do not necessarily have to correspond to physically or logically independent entities. These functional entities may be implemented in the form of software or in one or more hardware modules or integrated circuits, or these functional entities may be implemented in different processing apparatus and/or microcontroller apparatus.

In the following, maintenance operations on an elevator system may include the maintenance operations such as the corresponding inspection, the specific contents and/or items of maintenance operations are not limiting, which may vary depending on the specific operation objects. The primary purpose of the corresponding safety checking operation of entering the elevator hoistway to perform maintenance operation is to ensure the safety of maintenance individuals to enter the elevator hoistway, the object of the check operation, i.e., the corresponding functional components, may vary according to changes in the maintenance operation, which may be determined according to the corresponding safety checking operation procedure. The maintenance individual may be the corresponding maintenance operation body, which may be a person, even a robot, or the like.

Figure 1:
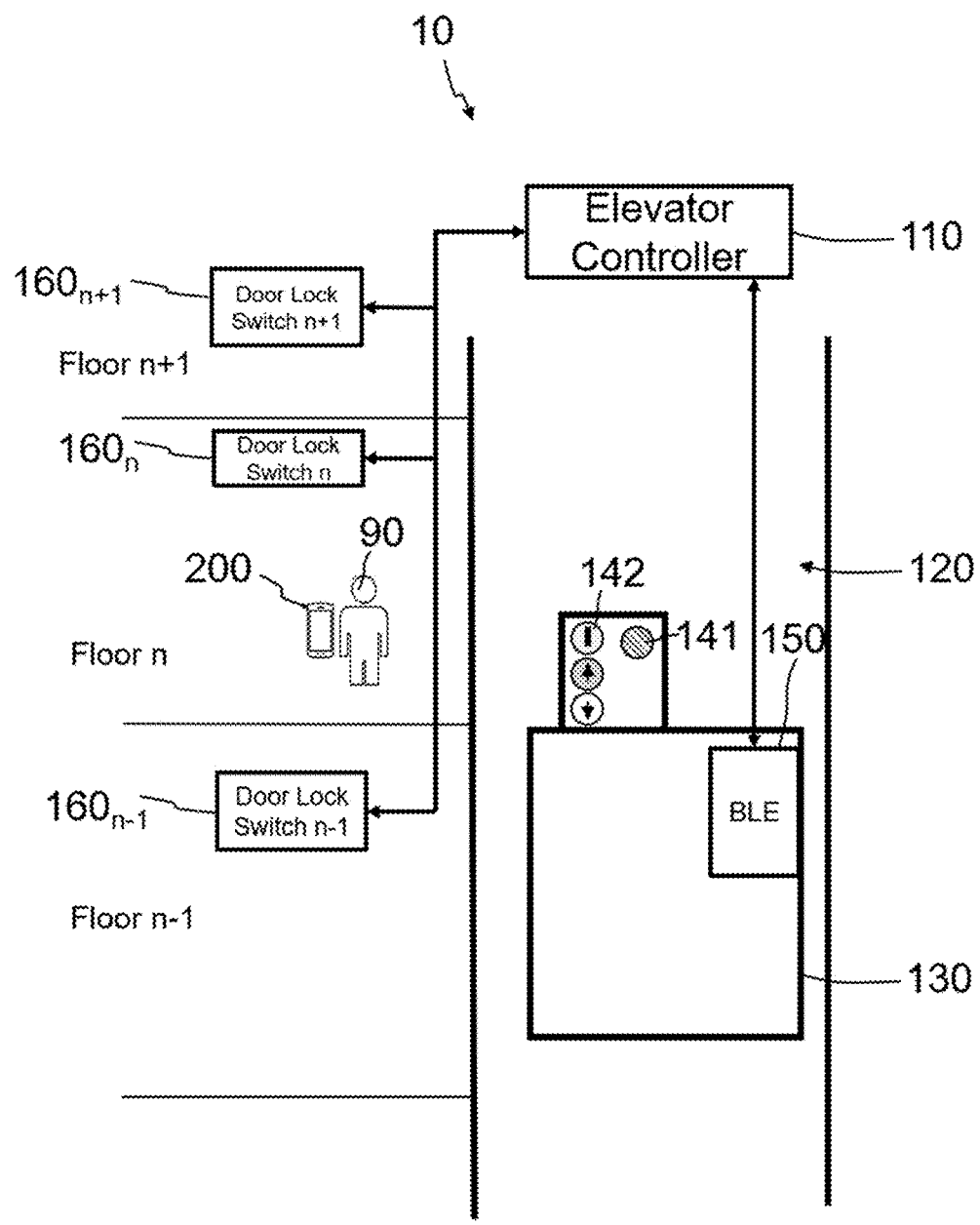
FIG. 1 is a schematic diagram of an elevator system according to an embodiment of the present invention.
Figure 2:
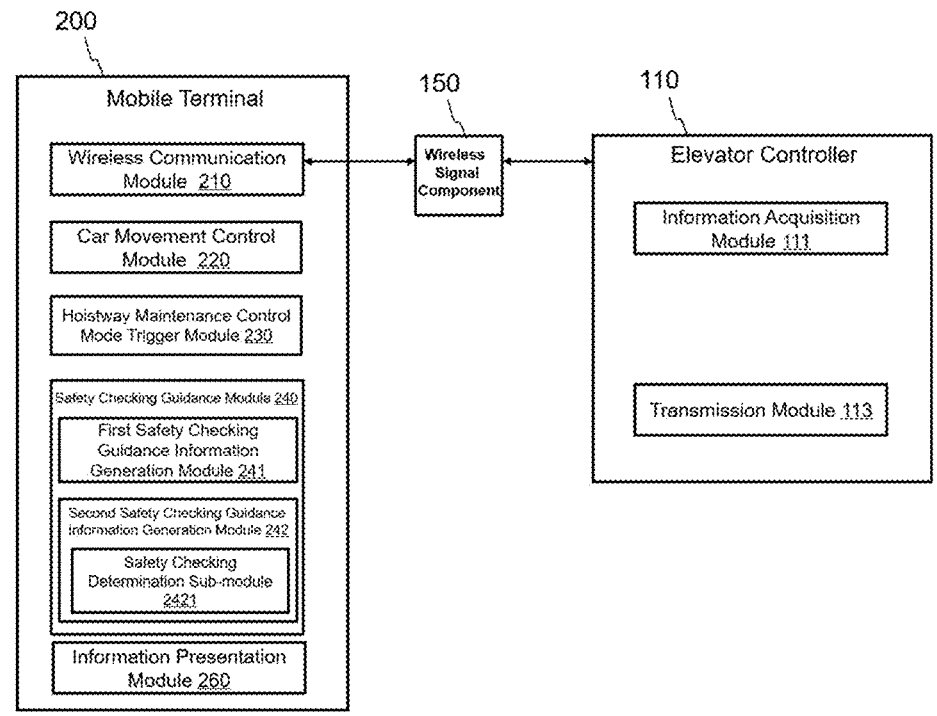
FIG. 2 is a structural schematic diagram of an apparatus for guiding a maintenance individual to perform a safety checking operation on the functional components of an elevator system according to an embodiment of the present invention.
Figure 3:
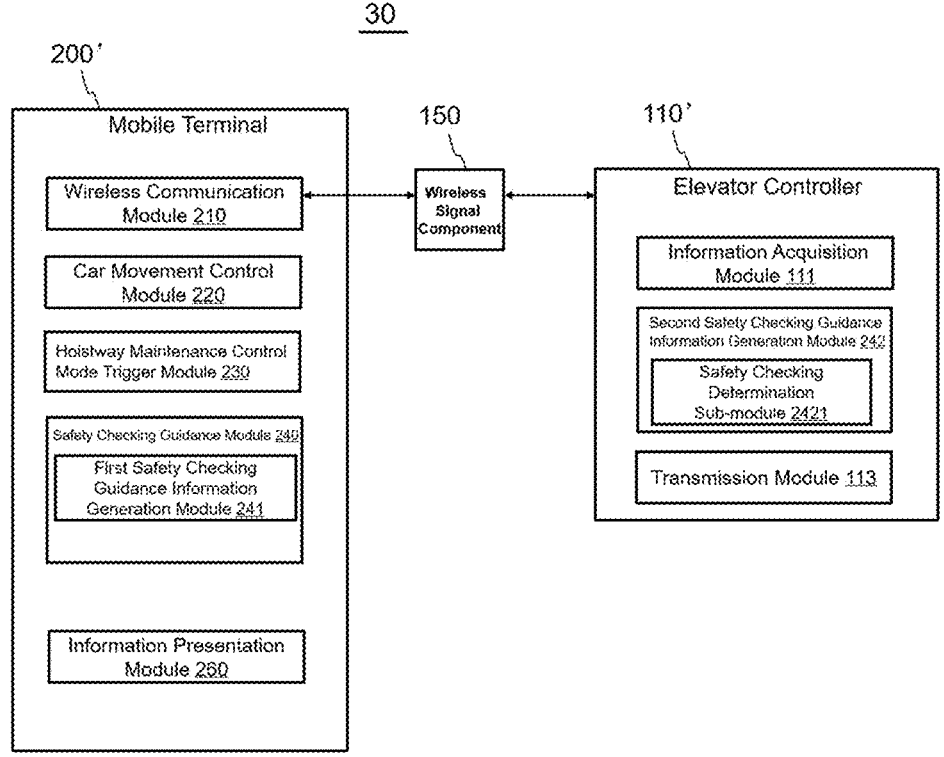
FIG. 3 is a structural schematic diagram of an apparatus for guiding a maintenance individual to perform a safety checking operation on the functional components of an elevator system according to yet another embodiment of the present disclosure.

FIG. 1 shows a schematic diagram of an elevator system according to an embodiment of the present invention: FIG. 2 shows a structural schematic diagram of an apparatus for guiding a maintenance individual to perform a safety checking operation on the functional components of an elevator system according to an embodiment of the present invention, wherein a module structure schematic diagram of a mobile terminal of an embodiment and an elevator controller of an embodiment of the present invention is shown: FIG. 3 shows a structural schematic diagram of an apparatus for guiding a maintenance individual to perform a safety checking operation on the functional components of an elevator system according to yet another embodiment of the present disclosure, wherein a module structure schematic diagram of a mobile terminal of yet another embodiment and an elevator controller of yet another embodiment of the present invention is shown.

As shown in FIG. 1, an elevator system 10 of an embodiment of the present invention may be installed in various buildings, the elevator system 10 comprises a plurality of one or more cars 130 traveling up and down in an elevator hoistway 120 of a building, one of which is schematically illustrated in FIG. 1: each car 130 is under control (e.g., scheduling control, travelling control, etc.) of an elevator controller 110 in the elevator system 10, traveling in the elevator hoistway 120 or to stop at a landing of a corresponding floor (e.g., floor n, where n is an integer greater than or equal to 2). In general, the elevator controller 110 may receive a call request command from the landing of each floor, performing operation control (e.g., scheduling control of each car 130) of the elevator based on the command. It will be understood that the specific control manner or control principle of the one or more cars 130 by the elevator controller 110 is not limiting.

The elevator system 10 may also comprise (landing) door lock switches 160 disposed at the landings of each floor, e.g. a door lock switch 160n-1 corresponding to floor (n-1), a door lock switch 160n corresponding to floor n, a door lock switch 160n+1 corresponding to floor (n+1); in the normal operating state, where the landing door is manually opened by a landing door lock key handling the door lock switch 160, the elevator controller 110 may determine the current state of the door lock switch 160 and control the car 130 to move in the elevator hoistway 120 not in response to the call request of the landing.

The elevator system 10 may also comprise a wireless signal component 150, which may be a plurality of, specifically, Bluetooth modules that may be capable of broadcasting Bluetooth signals, and may even be modules of Bluetooth Low Energy (BLE); the wireless signal component 150 may be connected to the elevator controller 110 in a wired or wireless manner, thereby the wireless signals broadcast therethrough may establish a wireless communication connection with the mobile terminal 200, the elevator controller 110 in turn may also establish a connection with the mobile terminal 200, information interaction between the elevator controller 110 and the mobile terminal 200 (the specific content of which will be illustrated in examples below) may be realized.

It will be understood that the specific type of the wireless signal component 150 is not limited to the above embodiments, but may also include other wireless beacons that may be used to enable near field wireless communication between the wireless signal component 150 and the mobile terminal 200.

The wireless signal component 150 may be specifically a BLE installed in a car 130, in this embodiment, a passenger carrying a personal mobile terminal in the car 130 may establish a wireless communication connection with that wireless signal component 150 and automatically issue a command of registering the destination floor; of course, in this embodiment, the wireless signal component 150 may also be installed in the landing area of each floor (not shown), and a passenger carrying the personal mobile terminal in the landing area may establish a wireless communication connection with that wireless signal component 150 and automatically issue a call request command. In other embodiments, the wireless signal component 150 may also be, for example, a BLE arranged in the elevator hoistway 120 for forming a Bluetooth MESH network. It will be understood that the wireless signal component 150 is in the elevator system 10 and is limited to establishing a wireless communication connection with and interacting with the mobile terminal 200 of an embodiment of the present invention, the wireless signal component 150 may also have other functions, e.g. for implementing an automatic call function.

The elevator system 10 of the embodiment shown in FIG. 1 may use an apparatus (hereinafter simply referred to as a "guiding apparatus") 20 or 30 for guiding a maintenance individual to perform a safety checking operation on the functional components of the elevator system, as shown in the embodiments of FIG. 2 or FIG. 3, thereby the safety checking operation is relatively easy to perform, moreover, it is easy to ensure that the maintenance individual 90 completes the safety checking operation accurately, improving the safety checking operation experience of the individual 90 while ensuring the safety of the maintenance individual 90 entering the elevator hoistway to perform the maintenance operation, avoiding the occurrence of casualty accidents. Partial function of the guiding apparatus 20 or 30 may be implemented by means of the mobile terminal 200 carried by the maintenance individual 90, which in one embodiment may serve as one component of the guiding apparatus 20 or 30, even as one component of the elevator system 10.

The guiding apparatus 20, the mobile terminal 200, and the elevator controller 110 of one embodiment of the present invention are illustrated in example below in conjunction with FIGS. 1 and 2.

Wherein, the mobile terminal 200 may specifically be various smart terminals having, for example, Bluetooth connection function, and is convenient for the maintenance individual 90 to carry, for example, the mobile terminal 200 may be a smart phone, a wearable smart device (e.g., smart bracelet, etc.), personal digital assistant (PAD), and the like, on which corresponding application components (e.g., APP components) may be installed to implement the corresponding functions described in the embodiments of the present invention. The mobile terminal 200 may be carried by a maintenance individual 90 to enter the elevator hoistway to perform a maintenance operation and is used for guiding the maintenance individual 90 to complete the safety checking operation on the corresponding functional components of the elevator system 10, and the mobile terminal 200 may guide the maintenance individual 90 step by step to sequentially complete the safety checking operation on the plurality of functional components when the number of the functional components requiring safety checking is more than one.

As shown in FIG. 2, the mobile terminal 200 may specifically be provided with a wireless communication module 210 (e.g. a BLE) that establishes a wireless communication connection with the wireless signal component 150, specifically, that establishes a near field communication connection based on a corresponding communication procedure, e.g., after sensing a wireless signal broadcast by the wireless signal component 150, such that the mobile terminal 200 may establish a connection with the elevator controller 110 and perform information interaction about the functional components under the safety checking.

In an embodiment, a car movement control module 220 may also be provided in the mobile terminal 200 for transmitting a first instruction to the elevator controller 110 via the wireless communication module 150, which is used to trigger the elevator controller 110 to control the car to move to a position suitable for a maintenance individual to entering the pit of the elevator hoistway 120 or the car roof of the car 130; when the elevator controller 110 receives that first instruction, it may control the corresponding hoisting apparatus to drive car 130 to move to that position. When, for example, a maintenance operation is to be performed on car roof of the car 130, the position may be a position where the car roof of the car 130 is substantially flush with the floor of a landing (e.g., the landing of the floor n as shown in FIG. 1) at which the maintenance individual 90 is currently located. It will be understood that this position may be preset or predefined in the elevator controller 110 that controls the car 130 to travel to that position in response to the first instruction. In this way, the car 130 can accurately travel to a proper position; and the introduction of the car movement control module 220 may make the operation simple and convenient compared to the existing condition in which a complex manual operation of the maintenance individual 90 to control the car 130 to travel to the proper position is required.

In an embodiment, the mobile terminal 200 may also be provided with a hoistway maintenance control mode trigger module 230 for transmitting a second instruction to the elevator controller 110 for triggering the elevator controller 110 to enter or exit the hoistway maintenance control mode in response to an input of the maintenance individual 90 (e.g., selecting to enter the "hoistway maintenance control mode" in an APP component of the mobile terminal 200).

The elevator controller 110 may also be predefined with a "hoistway maintenance control mode": the elevator controller 110, upon receiving the second instruction, may be triggered to exit, for example, the current "normal operation control mode" and enter the "hoistway maintenance control mode". The scheduling control of the car 130 under the "hoistway maintenance control mode" is different from the scheduling control of the car 130 under the normal operation control mode, the elevator controller 110 at least does not respond to the passenger's call instruction (e.g., call instruction from the landing) under the hoistway maintenance control mode and can acquire first information for determining whether the corresponding functional component passes the checking of the corresponding safety checking in real time, the first information may include the current state (e.g., states of "open", "close", etc.) of the corresponding functional components and the position change information corresponding to the car in the current state, it will be understood that as the functional components vary, the content of the current state information of the corresponding functional components acquired correspondingly is different. Under the "hoistway maintenance control mode", the movement speed of the car 130 is limited (being less than or equal to a predetermined value) so that only low speed travelling is possible, further reducing the risk of the maintenance individual 90.

It is noted that a plurality of sub-modes may be provided in the "hoistway maintenance control mode", which respectively correspond to different maintenance operations in the hoistway, for example, "car roof maintenance control sub-mode", "pit maintenance control sub-mode", and the maintenance individual 90 may select a corresponding sub-mode in the hoistway maintenance control mode trigger module 230 according to a maintenance operation to be performed currently, thereby triggering the generation of a corresponding second instruction in response to which the elevator controller 110 may switch into a corresponding sub-mode.

It should be noted that, in one embodiment, the car movement control module 220 may be implemented being integrated in the hoistway maintenance control mode trigger module 230; when the elevator controller 110 receives the abovementioned second instruction, it indicates that the car movement control module 220 also receives the abovementioned second instruction, the module 220 automatically controls the car 130 to move to a position suitable for a maintenance individual to enter the car roof of car 130 or the pit of the elevator hoistway 120 respectively when switching into the "car roof maintenance control sub-mode" or the "pit maintenance control sub-mode", automatically preparing for the next safety checking operation.

Continuing with FIG. 2, a safety checking guidance module 240 and an information presentation module 260 are also provided in the mobile terminal 200, wherein the safety checking guidance module 240 provides safety checking guidance information for guiding maintenance individuals to complete safety checking operations, the information presentation module 260 may present safety checking guidance information to the maintenance individuals 90 in the form of voice and/or user interface (UI), thereby conveniently guiding the maintenance individual 90 to perform safety checking operations on each functional component. It will be understood that the specific presentation manner of the safety checking guidance information is not limiting, and it is pre-editable.

In one embodiment, the safety checking guidance module 240 has a first safety checking guidance information generation module 241 and a second safety checking guidance information generation module 242 therein that primarily generate safety checking guidance information provided by the safety checking guidance module 240, i.e., the first safety checking guidance information and the second safety checking guidance information. It will be understood that the contents of the safety checking guidance information provided by the safety checking guidance module 240 are not limited to being generated in whole or in part by itself.

Wherein the first safety checking guidance information generation module 241 may generate first safety checking guidance information for guiding the maintenance individual 90 to perform state switching operations on the functional components: illustratively, the first safety checking guidance information may be presented by the information presentation module 260 to prompt the maintenance individual 90 for a corresponding state switching operation, for example, opening a door lock switch, pressing the car roof e-stop switch to a "stopping" state, pressing the car roof inspection switch to a "inspection" state, or the like. The first safety checking guidance information generation module 241 may be set with reference to a predefined safety checking operation procedure such that the first safety checking guidance information generated and the corresponding state switching operation conform to the corresponding safety checking operation procedure.

Wherein the second safety checking guidance information generation module 242 may generate, based on the first information, second safety checking guidance information that indicates whether the corresponding functional component passes the safety checking operation, wherein the first information refers to information used to determine whether the functional component passes the corresponding safety checking operation, which may be obtained, at least in part, by the information acquisition module 111 in the elevator controller 110. In an embodiment, the first information may include the current state of the functional component, and may further include position change information corresponding to the car in the current state.

Take the functional components as the car roof e-stop switch for example, the elevator controller 110 can acquire or extract the state information of the car roof e-stop switch (e.g. acquire the state information indicating a "stopping" state) in real time when guiding the maintenance individual 90 to perform a safety checking operation on the e-stop switch, by comparing with the previous state information, it may be determined that the maintenance individual 90 or the like has performed state switching operation on the car roof e-stop switch, while the elevator controller 110 also acquires the position change information of the car 130 in the current "stopping" state (assuming that the maintenance individual 90 presses the call button of the landing under the guidance of the first safety checking guidance information), and if the acquired position change information indicates that the position of the car 130 does not change, then the triggering function corresponding to the car roof e-stop switch in the "stopping" state may be safely and reliably performed, the second safety checking guidance information generation module 242 may generate the second safety checking guiding information indicating that the car roof e-stop switch has passed the safety checking operation, and based on the presented second safety checking guiding information, the maintenance individual 90 can be successfully guided to complete the safety checking operation on the car roof e-stop switch.

Note that in other embodiments, the position change information corresponding to the car 130 in the current state may not be acquired by the elevator controller 110, for example, it may be determined manually whether the car 130 has moved, specifically the position change information may be input by prompting the maintenance individual 130 to click "it is determined that the car has not moved".

In an embodiment, a safety checking determination sub-module 2421 may also be provided in the second safety checking guidance information generation module 242, that safety checking determination sub-module 2421 is used to determine whether the corresponding functional component passes the safety checking operation based on the first information, e.g., determining whether that functional component is normally triggered to perform a corresponding function based on the current state of the functional component and the position change information corresponding to the car in the current state, thereby determining whether that functional component passes the safety checking operation. The second safety checking guidance information generation module 242 further generate the second safety checking guidance information indicating whether the corresponding functional component passes the safety checking operation based on the determination. It should be understood that the determination process performed by the second safety checking guidance information generation module 242 may be done completely automatically, and thus some manual operations of the maintenance individual 90 may be omitted, and the input errors of the maintenance individual 90 and the subjective laziness of the maintenance individual 90 may be avoided, and it is also advantageous for monitoring the safety checking operations of the maintenance individual 90.

It is noted that, for different safety checking operations, the functional components requiring safety checking operations are different, the corresponding safety checking operation procedure to be followed are not the same so that the safety checking guidance information provided by the safety checking guidance module 240 is, of course, not the same.

Illustratively, when the maintenance operation is correspondingly a maintenance operation performed on the car roof of the car 130, the functional components requiring the safety checking operation correspondingly includes a door lock switch 160 of a certain floor, a car roof e-stop switch 141, and a car roof inspection switch 142 as shown in FIG. 1: accordingly, the safety checking guidance information provided by the safety checking guidance module 240 includes: information for guiding the maintenance individual 90 to complete a safety checking operation for the door lock switch 160, information for guiding the maintenance individual 90 to complete the safety checking operation for the car roof e-stop switch 141 and information for guiding the maintenance individual 90 to complete a safety checking operation for the car roof inspection switch 142: the sequential presentation of these safety checking guidance information may guide the maintenance individual 90 to sequentially complete the safety checking or safety verification of the door lock switch 160, the car roof e-stop switch 141, the car roof inspection switch 142, thereby completing a safety checking operation before the maintenance individual 90 entering the car roof of the car 130.

In yet another example, when the maintenance operation is correspondingly a maintenance operation performed in the pit of the elevator hoistway 120, the functional components requiring the safety checking operation correspondingly includes a door lock switch 160 of a certain floor, an upper e-stop switch disposed at the pit, and a lower e-stop switch disposed at the pit: accordingly, the safety checking guidance information provided by the safety checking guidance module 240 includes: information for guiding the maintenance individual 90 to complete the safety checking operation for the door lock switch 160, information for guiding the maintenance individual 90 to complete the safety checking operation for the upper e-stop switch and information for guiding the maintenance individual 90 to complete the safety checking operation for the lower e-stop switch. The sequential presentation of these safety checking guidance information may guide the maintenance individual 90 to sequentially complete safety checking or safety verification of the door lock switch 160, the upper e-stop switch, the lower e-stop switch, thereby completing the safety checking operation before the maintenance individual 90 entering the pit.

When the number of functional components requiring safety checking is more than one, the safety checking guidance module 240 may further provide safety checking guidance information for guiding the maintenance individual 90 to complete the safety checking operation of the next functional component based on a predefined safety checking operation procedure with determining that a certain functional component passes the safety checking, so that the maintenance individual 90 may be guided to sequentially complete the safety checking operation on the plurality of functional components in a distributed manner, therefore the safety checking operation is complete and good in continuity.

Continuing with as shown in FIG. 2, an information transmission module 113 may also be provided in the elevator controller 110, which actively transmits the above-mentioned first information acquired in the "hoistway maintenance control mode" for example, certainly other information acquired may be transmit as well: the information transmitted by the transmission module 113 may be transmitted to the wireless signal component 150 in either wired or wireless manner, and in turn transmitted to the wireless communication module 210 of the mobile terminal 200 in a wireless manner through the wireless signal component 150; in this way, the mobile terminal 200 and the elevator controller 110 may realize information interaction conveniently. The specific contents of the information interaction include, but not limited to, the first information, the first instruction, the second instruction and the like described above.

As shown in FIG. 3, the guiding apparatus 30 may also be applied in the elevator system 10, which completes the safety checking operation on the corresponding functional components of the elevator system 10 by the mobile terminal 200' carried by the maintenance individual 90. In contrast to the guiding apparatus 20 shown in FIG. 2, the primary difference is that the mobile terminal 200' may not perform the function of generating the second safety checking guidance information, but instead performs the function of generating the second safety checking guidance information by the elevator controller 110': specifically and correspondingly, by disposing in the elevator controller 110' of the embodiment shown in FIG. 3 the second safety checking guidance information generation module 242 and the safety checking determination sub-module 2421 in the mobile terminal 200 of the embodiment shown in FIG. 2, the mobile terminal 200' of the corresponding embodiment is formed as well. In addition to the second safety checking guidance information generation module 242 and the safety checking determination sub-module 2421, the mobile terminal 200' is basically provided with other modules in the mobile terminal 200 in the embodiment shown in FIG. 2, the description of which is omitted here: the elevator controller 110' is also provided with an information acquisition module 111 and a transmission module 113, the description of which is omitted here as well.

In the guiding apparatus 30 of the embodiment shown in FIG. 3, the second safety checking guiding information generated by the second safety checking guiding information generation module 242 of the elevator controller 110' may be transmitted to the corresponding mobile terminal 200' by the wireless signal component 150 so that the safety checking guiding module 240 of the mobile terminal 200' may also provide the second safety checking guiding information, and present the second safety checking guidance information by the information presentation module 260.

The mobile terminal 200 or 200', the guiding apparatus 20 or 30 of the above embodiments may guide the maintenance individual 90 to complete the safety checking operation, which may effectively prevent the maintaining individual 90 from using a inspection switch or the like to control the car to move prior to completing the safety checking operation, ensuring the safety of the maintenance individual 90; in addition, the maintenance individual 90 may be effectively guided to perform safety checking operation, for example, according to the safety checking operation procedure, avoiding wrong operations and substandard of operation, thereby greatly improving the maintenance experience of the maintenance individual and effectively guaranteeing the safety of the next maintenance operation: moreover, the mobile terminal 200 or 200', the guiding apparatus 20 or 30 of the above embodiments may even reduce some manual operation with subjective factors, thereby taking the place of the maintenance individual to perform part of the safety maintenance operation, thus greatly improving the efficiency of the safety checking operation.

Figure 4:
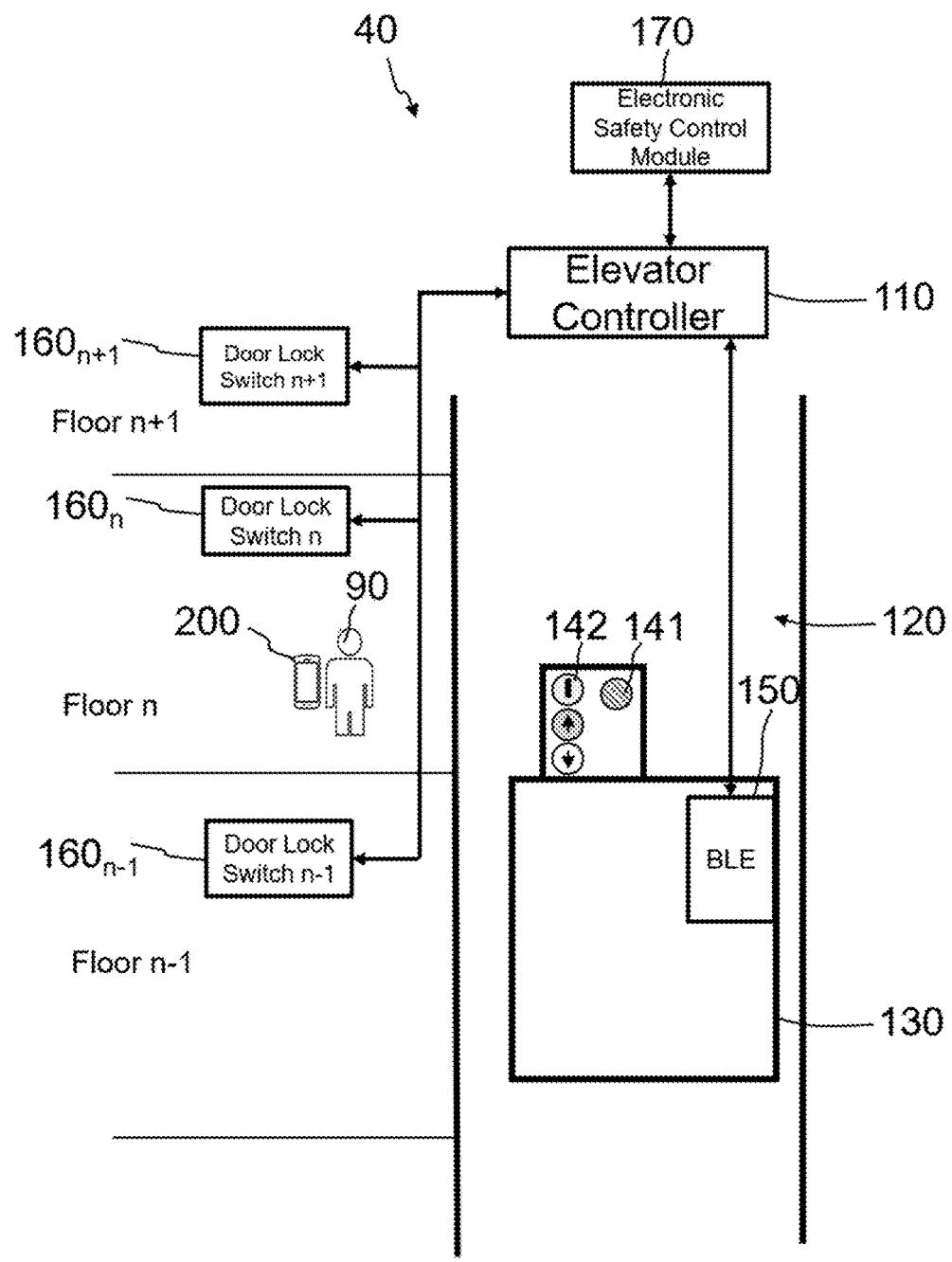
FIG. 4 is a schematic diagram of an elevator system according to an embodiment of the present invention.

In an elevator system 40 of yet another embodiment, as shown in FIG. 4, the maintenance individual 90 may even be replaced by an electronic safety control module (e.g., PESSRAL, Programmable Electronic Systems in Safety Related Applications for Lifts) 170 to automatically or remotely complete the state switching operation on the functional components currently under safety checking without the need of the maintenance individual 90, greatly improving the safety checking operation experience and improving the efficiency of the safety checking operation.

As shown in FIG. 4, compared to the elevator system 10 shown in FIG. 1, the elevator system 40 also includes an electronic safety control module 170, which may be disposed corresponding to the elevator controller 110 and connected with the elevator controller 110 in wired manner, for example, the electronic safety control module 170 may even be disposed on car roof of the car. Thus, the mobile terminal 200 or 200' may actually perform information interaction with the electronic safety control module 170 indirectly. The first safety checking guidance information generated by the first safety checking guidance information generation module 241 of the mobile terminal 200 or 200' may be transmitted to the elevator controller 110 through the wireless signal component 150, and even further to the electronic safety control module 170, which may automatically complete the state switching operation on the functional components currently under safety checking in response to the first safety checking guidance information (e.g., guiding the maintenance individual 90 to input instructions for triggering the electronic safety control module 170 to automatically perform at least part of the safety checking operation). Specifically, the transmission of the first safety checking guidance information described above may be performed in response to for example an input (e.g., a click of "confirm", etc.) on a user interface of the mobile terminal 200 or 200' of the guided maintenance individual 90, triggering the abovementioned transmission, further triggering the electronic safety control module 170 to automatically perform, in simulation, the state switching operation on the functional components currently under safety checking. It is noted that a safety checking operation execution module (e.g., following a preset safety checking operation execution program) is specifically disposed in the electronic safety control module 170, thereby automatically performing the safety checking operation on the corresponding component under the trigger of an instruction input by the maintenance individual 90.

Illustratively, when the first safety checking guidance information is correspondingly the information guiding the maintenance individual 90 to perform a state switching operation (e.g., pressing to switch to a "stopping" state) on the car roof e-stop switch 141, the information is transmitted to the electronic safety control module 170 in real time, thus, the electronic safety control module 170 may automatically complete the state switching operation on the car roof e-stop switch 141 currently under safety checking in response to the information without the need of the maintenance individual 90 to enter the elevator hoistway 120 to press the car roof e-stop switch 141 to the "stopping" state, avoiding such trouble of field operation, for example, in the elevator hoistway 120, greatly improving the experience and efficiency of the safety checking operation.

Figure 5:
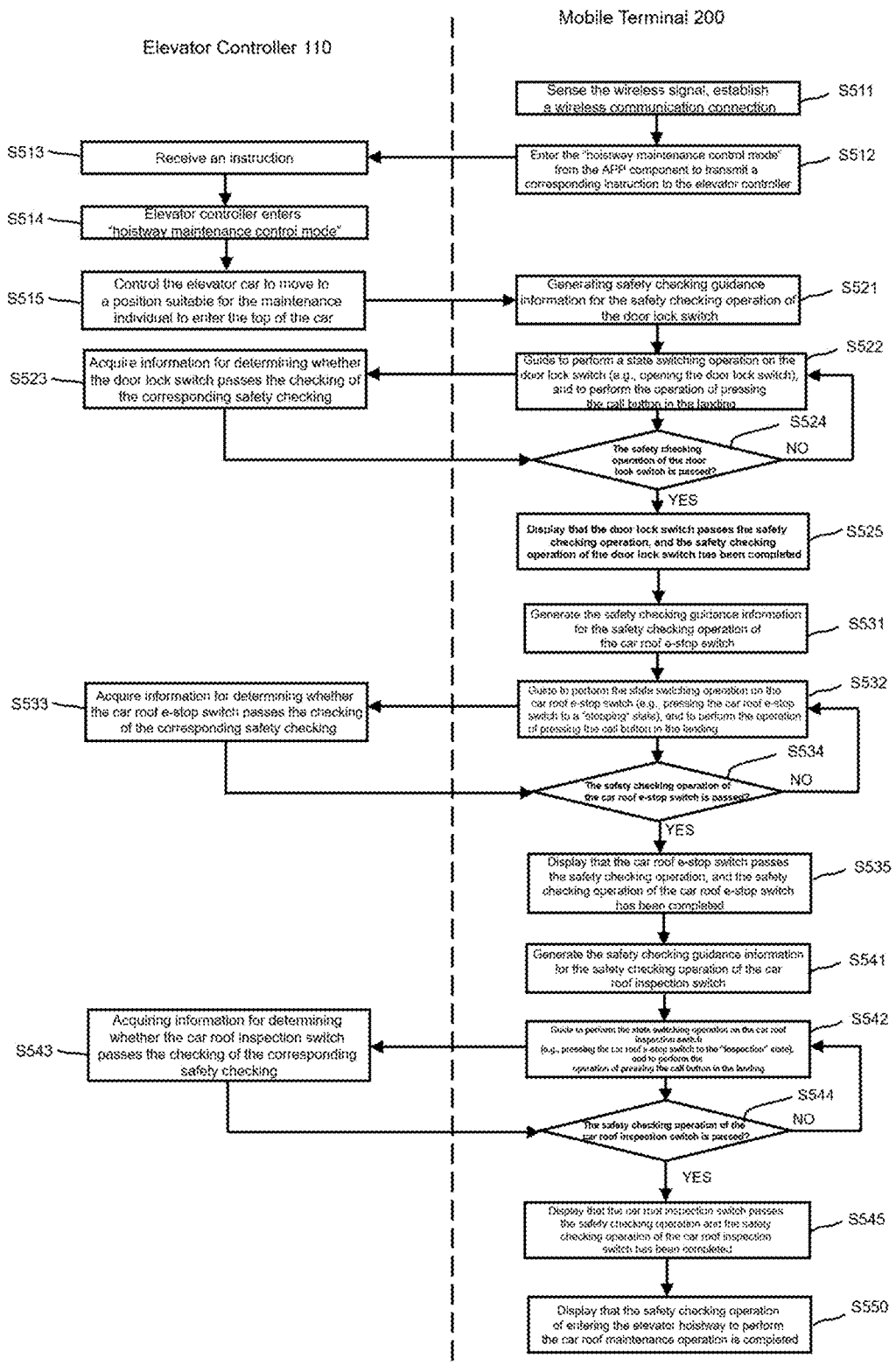
FIG. 5 is a flowchart of a method for guiding a maintenance individual to perform a safety checking operation on functional components of an elevator system according to an embodiment of the present invention.
Figure 6:
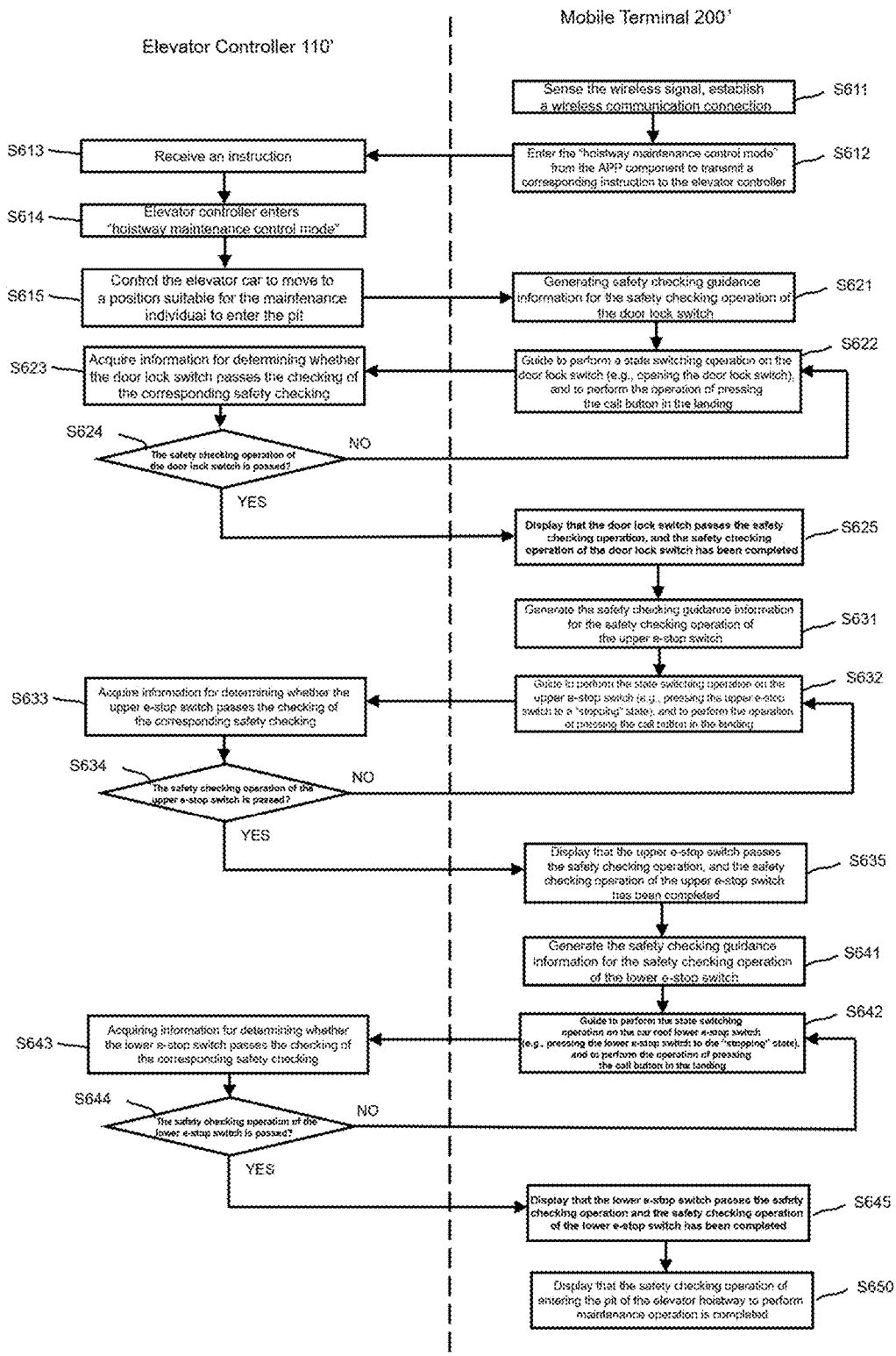
FIG. 6 is a flowchart of a method for guiding a maintenance individual to perform a safety checking operation on functional components of an elevator system according to yet another embodiment of the present disclosure.

FIG. 5 shows a flowchart of a method for guiding a maintenance individual to perform a safety checking operation on functional components of an elevator system according to an embodiment of the present invention: FIG. 6 shows a flowchart of a method for guiding a maintenance individual to perform a safety checking operation on functional components of an elevator system according to yet another embodiment of the present disclosure. Further in conjunction with FIGS. 1-6 below, a method for guiding a maintenance individual to perform a safety checking operation on functional components of an elevator system (hereinafter referred to simply as a "guiding method") of an embodiment of the present invention is illustrated as an example, and the function of a corresponding component or module in the guiding apparatus 20 or 30 is specifically illustrated, accordingly.

In the guiding method shown in FIG. 5, the maintenance operation is illustrated as an example of a maintenance operation performed on the car roof of the car, and specifically, the safety checking operation that required to be performed before entering the car roof of the car is described as an example, wherein the corresponding functional components that need safety checking include a door lock switch 160, a car roof e-stop switch 141, and a car roof inspection switch 142 as shown in FIGS. 1 and 4. Also, FIG. 5 schematically shows the steps of the guiding method completed in the mobile terminal 200 and the steps of the guiding method completed in the elevator controller 110.

First, the maintenance individual 90 carries the mobile terminal 200 of the embodiment shown in FIG. 2 of the present invention to be guided to perform a safety checking operation before entering onto the car roof of the car for a maintenance operation. The elevator system to be maintained may be determined and the corresponding authority (e.g., authority to establish a wireless communication connection) or authentication may be obtained by scanning the two-dimensional code (QR code) through the mobile terminal 200 or entering manually and the like.

In step S511, the mobile terminal 200 senses the wireless signal to establish a wireless communication connection with, for example, the wireless signal component 150 in the car 130. By this step, a connection between the mobile terminal 200 and the elevator controller 110 of the elevator system 10 that needs to be maintained may be completed to prepare for the following information interaction between them.

In step S512, enter the "hoistway maintenance control mode" from the APP component to transmit a corresponding instruction to the elevator controller 110. In this step, the maintenance individual 90 may operate a corresponding APP component on the mobile terminal 200, for example, select to enter the "hoistway maintenance control mode", specifically, for example, select a "car roof maintenance control sub-mode", by which operation the mobile terminal 200 actually transmits instructions equivalent to the first and second instructions described above to the elevator controller 110. Thus, this step S512 may be accomplished by means of the car movement control module 220, the hoistway maintenance control mode trigger module 230 shown in FIG. 2.

In step S513, the elevator controller 110 receives the instruction accordingly.

In step S514, in response to the instruction, the elevator controller 110 enters a "hoistway maintenance control mode", specifically, for example, enters a "car roof maintenance control sub-mode".

In step S515, control the car 130 to move to a position suitable for the maintenance individual 90 to enter the car roof of the car, where the car roof of the car 130 is substantially flush with the floor of the landing (e.g., a landing of floor n as shown in FIG. 1) where the maintenance individual 90 is currently located. After step S515 is completed, the elevator controller 110 may feedback the corresponding information to the mobile terminal 200 to indicate that the mobile terminal 200 may start conducting the guiding operation.

In step S521, generating safety checking guidance information for the safety checking operation of the door lock switch 160. In this step S521, the safety checking guidance information for the door lock switch 160 may be generated according to a corresponding safety checking operation procedure. This step S521 may be accomplished by means of the first safety checking guidance information generation module 241 shown in FIG. 2.

In step S522, the maintenance individual is guided to perform a state switching operation (e.g., opening the door lock switch 160) on the door lock switch 160, and to perform the operation of pressing the call button in the landing. In this step S522, the partial safety checking guidance information generated in step S521 is to be presented in the form of, for example, a user interface and a voice prompt, the maintenance individual 90 will be guided to perform a state switching operation, e.g., opening on the door lock switch, and optionally, the maintenance individual 90 may also be guided by way of the presentation of a user interface and/or a voice prompt to press on the call button in the landing to verify whether the external call is still active in the state that the door lock switch 160 is opened.

In step S523, acquiring information for determining whether the door lock switch 160 passes the corresponding checking of the safety checking, e.g., acquiring the current state of the door lock switch 160 and the position change information corresponding to the car in the current state (e.g. whether the car is moving or not). This step S523 may be accomplished by the information acquisition module 111 in the elevator controller 110, and the acquired information may be transmitted to the mobile terminal 200.

In step S524, it is determined or decided whether a safety checking operation of the door lock switch is passed. In step S524, a determination or decision operation is performed based on the information acquired in step S523; for example, if the acquired information includes: the door lock switch 160 is in an open state and the car 130 is not moving, then it may be determined that the door lock switch 160 has experienced the state switching operation and the function is normal, thereby determining as "yes", that is, it is determined that the safety checking operation of the door lock switch 160 is passed, thus entering step S525, otherwise returning to step S522 to continue guiding the maintenance individual 90 to perform the safety checking operation for the door lock switch 160. This step S524 may be accomplished by the safety checking determination sub-module 2421 in the mobile terminal 200.

In step S525, it is displayed that the door lock switch 160 passes the safety checking operation, and the safety checking operation of the door lock switch 160 has been completed. By this step S525, the maintenance individual 90 may be guided to get to know that the door lock switch 160 has passed the a safety checking operation, preparing for the safety checking operation of the next functional component (e.g., the car roof e-stop switch 141). This step S525 may be accomplished by the information presentation module 260 in the mobile terminal 200.

In step S531, the safety checking guidance information for the safety checking operation of the car roof e-stop switch 141 is generated. In this step S531, safety checking guidance information for the car roof e-stop switch 141 may be generated according to the corresponding safety checking operation procedure. This step S531 may be accomplished by means of the first safety checking guidance information generation module 241 shown in FIG. 2.

In step S532, the maintenance individual is guided to perform the state switching operation on the car roof e-stop switch 141 (e.g., pressing the car roof e-stop switch to a "stopping" state), and to perform the operation of pressing the call button in the landing. In this step S532, the partial safety checking guidance information generated in step S531 will be presented, for example, in the form of a user interface and a voice prompt, the maintenance individual 90 will be guided to, for example, perform a state switching operation of pressing the car roof e-stop switch 141 to a "stopping" state, then be guided to close the landing door to close the door lock switch, optionally, the maintenance individual 90 may also be guided to press the call button in the landing by way of the presentation of a user interface and/or a voice prompt to verify whether the external calling is still active in the state that the door lock switch 160 is opened.

In step S533, acquiring information for determining whether the car roof e-stop switch 141 passes the corresponding checking of the safety checking, for example, acquiring the current state of the car roof e-stop switch 141 and the position change information corresponding to the car in the current state (e.g., whether the car is moving or not). This step S533 may be accomplished by the information acquisition module 111 in the elevator controller 110, and the acquired information may be transmitted to the mobile terminal 200.

In step S534, it is determined or decided whether the safety checking operation of the car roof e-stop switch 141 is passed. In step S534, a determination or decision operation is performed based on the information acquired in step S533: for example, if the acquired information includes: the car roof e-stop switch 141 is in a "stopping" state and the car 130 is not moving, then it may be determined that the car roof e-stop switch 141 has experienced the state switching operation and the function is normal, thereby determining as "yes", that is, it is determined that the safety checking operation of the car roof e-stop switch 141 is passed, thus entering step S535, otherwise returning to the step S532 to continue guiding the maintenance individual 90 to perform the safety checking operation for the door roof e-stop switch 141. This step S534 may be accomplished by the safety checking determination sub-module 2421 in the mobile terminal 200.

In step S535, it is displayed that the car roof e-stop switch 141 passes the safety checking operation, and the safety checking operation of the car roof e-stop switch has been completed. By this step S535, the maintenance individual 90 may be guided to get to know that the car roof e-stop switch 141 has passed the safety checking operation, preparing for the safety checking operation of the next functional component (e.g., the car roof inspection switch 142). This step S535 may be accomplished by the information presentation module 260 in the mobile terminal 200.

In step S541, the safety checking guidance information for the safety checking operation of the car roof inspection switch 142 is generated. In this step S541, the safety checking guidance information for the car roof inspection switch 142 may be generated according to the corresponding safety checking operation procedure. This step S541 may be accomplished by means of the first safety checking guidance information generation module 241 shown in FIG. 2.

In step S542, the maintenance individual is guided to perform the state switching operation on the car roof inspection switch 142 (e.g., pressing the car roof e-stop switch to the "inspection" state) and to perform the operation of pressing the call button in the landing.

In this step S542, the partial safety checking guidance information generated in step S541 will be presented by way of, for example, a user interface and a voice prompt, and the maintenance individual 90 will be guided to perform the state switching operation of, for example, pressing the car roof inspection switch 142 to an "inspection" state, then be guided to close the landing door to close the door lock switch, optionally, the maintenance individual 90 may also be guided to press the call button in the landing by way of the presentation of the user interface and/or the voice prompt to verify whether the external calling is still active in the state that the door lock switch 160 is opened.

In step S543, acquiring the information for determining whether the car roof inspection switch 142 passes the corresponding checking of the safety checking, for example acquiring the current state of the car roof inspection switch 142 and the position change information corresponding to the car in the current state (e.g., whether the car is moving or not). This step S543 may be accomplished by the information acquisition module 111 in the elevator controller 110, and the acquired information may be transmitted to the mobile terminal 200.

In step S544, it is determined or decided whether the safety checking operation of the car roof inspection switch 142 is passed. In step S544, a determination or decision operation is performed based on the information acquired in step S543: for example, if the acquired information includes: the car roof inspection switch 142 is in the "stopping" state and the car 130 is not moving, then it may be determined that the car roof inspection switch 142 has experienced the state switching operation and the function is normal, thereby determining as "yes", that is, it is determined that the safety checking operation of the car roof inspection switch 142 is passed, entering step S545, otherwise returning to step S542 to continue guiding the maintenance individual 90 to perform the safety checking operation for the car roof inspection switch 142. This step S544 may be accomplished by the safety checking determination sub-module 2421 in the mobile terminal 200.

In step S545, it is displayed that the car roof inspection switch 142 passes the safety checking operation and the safety checking operation of the car roof inspection switch has been completed. By this step S545, the maintenance individual 90 may be guided to get to know that the car roof inspection switch 142 has passed the safety checking operation. This step S535 may be accomplished by the information presentation module 260 in the mobile terminal 200.

In step S550, it is displayed that the safety checking operation of entering the elevator hoistway to perform the car roof maintenance operation is completed. To this end, the corresponding safety checking operation is completed under guidance, the functions of the door lock switch 160, the car roof e-stop switch 141 and the car roof inspection switch 142 may be ensured to be normal, and dangerous accidents in the maintenance process are prevented.

In the guiding method of the above embodiments, the maintenance individual 90 to enter the car roof of the car for maintenance operation will be effectively guided to operate according to the safety checking operation procedure, avoiding the occurrence of nonstandard operating behaviors such as wrong operations and missing operations, thus the safety performance of the maintenance operation requiring to entering the car roof of the car is ensured; and during the process of the safety checking operation, some operations (e.g., opening and closing the door repeatedly) may be omitted, and compared with the existing safety checking operation mode, the workload is reduced and the efficiency is improved, greatly improving the experience of the maintaining individual 90.

Note that in other alternative embodiment, in steps S522, S532, S542, corresponding operations may be performed on the mobile terminal 200 as shown in FIG. 4, by controlling the completion of the above-described state switching operations, and even calling operations through the electronic safety control module 170 as shown in FIG. 4, the workload of the maintenance individual is further reduced (e.g., especially without need of repeatedly entering the elevator hoistway 120 to perform the operation of pressing the corresponding button), improving efficiency and the maintaining experience.

It should be noted that after the car roof maintenance operation is completed, the maintenance individual 90 may also be guided to complete the safety checking operation following the maintenance operation based on similar guiding methods as above, which will not be exemplarily described in detail herein any more.

In the guiding method shown in FIG. 6, the maintenance operation is illustrated as an example of a maintenance operation performed at the pit, and specifically, the safety checking operation that required to be performed before entering the pit is described as an example, wherein the corresponding functional components that requiring safety checking include the door lock switch 160, an upper e-stop switch and a lower e-stop switch disposed in the pit. Also, FIG. 6 schematically shows the steps of the guiding method completed in the mobile terminal 200' and the steps of the guiding method completed in the elevator controller 110'.

First, the maintenance individual 90 carries the mobile terminal 200' of the embodiment shown in FIG. 3 of the present invention to be guided to perform a safety checking operation before entering into the pit for a maintenance operation. The elevator system to be maintained may be determined and the corresponding authority (e.g., authority to establish a wireless communication connection) or authentication may be obtained by scanning the two-dimensional code (QR code) through the mobile terminal 200' or entering manually and the like.

In step S611, the mobile terminal 200' senses the wireless signal to establish a wireless communication connection with, for example, the wireless signal component 150 in the car 130.

In step S612, enter the "hoistway maintenance control mode" from the APP component to transmit a corresponding instruction to the elevator controller 110'.

In step S613, the elevator controller 110' receives the instruction accordingly.

In step S614, in response to the instruction, the elevator controller 110' enters a "hoistway maintenance control mode", specifically, for example, enters a "pit maintenance control sub-mode".

Note that the above steps S611 to S614 are substantially the same as the steps S511 to S514 of the embodiment shown in FIG. 5, respectively, and detailed description thereof is omitted herein.

In step S615, control the car 130 to move to a position suitable for the maintaining individual 90 to enter the pit. After step S615 is completed, the elevator controller 110' may feedback the corresponding information to the mobile terminal 200' to indicate that the mobile terminal 200' may start performing the guiding operation.

In step S621, safety checking guidance information for the safety checking operation of the door lock switch 160 is generated.

In step S622, the maintenance individual is guided to perform a state switching operation (e.g., opening the door lock switch) on the door lock switch 160, and to perform the operation of pressing the call button in the landing.

In step S623, acquiring information for determining whether the door lock switch 160 passes the corresponding checking of the safety checking.

In step S624, it is determined or decided whether a safety checking operation of the door lock switch 160 is passed.

In step S625, it is displayed that the door lock switch 160 passes the safety checking operation, and the safety checking operation of the door lock switch has been completed.

Note that the above steps S621 to S625 are substantially the same as steps S521 to S525 of the embodiment shown in FIG. 5, respectively, and detailed description thereof is omitted herein.

In step S631, the safety checking guidance information for the safety checking operation of the upper e-stop switch is generated.

In step S632, the maintenance individual is guided to perform the state switching operation on the upper e-stop switch (e.g., pressing the upper e-stop switch to a "stopping" state), and to perform the operation of pressing the call button in the landing.

In step S633, acquiring information for determining whether the upper e-stop switch passes the checking of the corresponding safety checking.

In step S634, it is determined or decided whether the safety checking operation of the upper e-stop switch is passed.

In step S635, it is displayed that the upper e-stop switch passes the safety checking operation, and the safety checking operation of the upper e-stop switch has been completed.

In step S641, the safety checking guidance information for the safety checking operation of the lower e-stop switch is generated.

In step S642, the maintenance individual is guided to perform the state switching operation on the lower e-stop switch (e.g., pressing the lower e-stop switch to the "stopping" state) and may also be guided to perform the state recovering operation on the upper e-stop switch (e.g., pressing the upper e-stop switch to the "normal" state) and to perform the operation of pressing the call button in the landing.

In step S643, acquiring the information for determining whether the lower e-stop switch passes the checking of the corresponding safety checking.

In step S644, it is determined or decided whether the safety checking operation of the lower e-stop switch is passed.

In step S645, it is displayed that the lower e-stop switch passes the safety checking operation and the safety checking operation of the lower e-stop switch has been completed.

Note that the above steps S631 to S635 are substantially the same as the steps S531 to S535 of the embodiment shown in FIG. 5, respectively, and the above steps S641 to S645 are also substantially the same as the steps S531 to S535 of the embodiment shown in FIG. 5, respectively, and the detailed description thereof is omitted.

In S650, it is displayed that the safety checking operation of entering the pit of the elevator hoistway to perform maintenance operation is completed. To this end, the corresponding safety checking operation is completed under guidance, the functions of the door lock switch 160, the upper e-stop switch and the lower e-stop switch may be ensured to be normal, and dangerous accidents in the maintenance process are prevented.

In the guiding method of the above embodiment, the maintenance individual 90 to enter the pit for maintenance operation will be effectively guided to operate according to the safety checking operation procedure, avoiding the occurrence of nonstandard operating behaviors such as wrong operations and missing operations, thus the safety performance of the maintenance operation requiring entering the pit of the car is ensured; and during the process of the safety checking operation, some operations (e.g., opening and closing the door repeatedly) may be omitted, and compared with the existing safety checking operation mode, the workload is reduced and the efficiency is improved, greatly improving the experience of the maintaining individual 90.

It will be understood that the "safety checking guidance information" herein is not limited to the information used to guide the maintenance individual 90 to directly complete an overall checking operation (e.g., guiding a user to open or close the door switch, inspect the switch, etc.), but also includes the information for guiding the maintenance individual 90 to indirectly complete the overall checking operation (e.g., for guiding the maintenance individual 90 to input instructions to automatically complete a specific overall checking operation through the electronic safety control module 170).

It is noted that, the mobile terminal 200 or 200' of the above embodiment of the present invention may be implemented by the computer program instructions, for example, implemented by dedicated APPs, these computer program instructions may be provided to the processor of a general purpose computer, a dedicated computer, or other programmable data processing device to constitute the mobile terminal 200 or 200' of an embodiment of the present invention, also, these instructions, which may be executed by a processor of a computer or other programmable data processing device to create units or components for implementing the functions/operations specified in these flowcharts and/or blocks and/or one or more flowcharts.

Likewise, the elevator controller 110 or 110' of the elevator system 10 of the above embodiment of the present invention may be implemented by computer program instructions, for example, implemented by dedicated programs, these computer program instructions may be provided to the processor to constitute the information acquisition module 111 of the embodiments of the present invention, also, these instructions may be executed by a processor of a computer or other programmable data processing device to create units or components for implementing the functions/operations specified in these flowcharts and/or blocks and/or one or more flowcharts.

Furthermore, these computer program instructions may be stored in a computer-readable memory, which may instruct a computer or other programmable processor to implement functions in a particular manner such that these instructions stored in the computer-readable memory constitute fabrication products containing the instruction components implementing the functions/operations specified in one or more blocks of the flowcharts and/or block diagrams.

It should also be noted that, in some alternative implementations, the functions/operations shown in the blocks may not occur on the order shown in the flowcharts. For example, two blocks shown in succession may, in fact, be executed substantially concurrently or these blocks may sometimes be executed in the reverse order, specifically depending upon the function/operation involved.

It is noted that the elements disclosed and depicted herein (including flowcharts and block diagrams in the figures) mean logical boundaries between elements. However, according to software or hardware engineering practice, the depicted elements and their functions may be executed on a machine by a computer executable medium with a processor capable of executing program instructions stored thereon, the program instructions being in form of a monolithic software structure, of a stand-alone software module, or of a module using external programs, code, services, and the like, or any combination thereof, and all such execution schemes may fall within the scope of the present disclosure.

Although the different non-limiting implementations have particularly illustrated components, implementations of the invention are not limited to these particular combinations. It is possible to use some of the assemblies or features from any of the non-limiting implementations in combination with features or assemblies from any other non-limiting implementations.

Although particular order of steps is shown, disclosed, and claimed, it should be appreciated that the steps may be implemented, separated or combined in any order, unless otherwise indicated and still benefit from the present disclosure.

The foregoing description is exemplary and is not defined to be limited thereto. Various non-limiting implementations are disclosed herein, however, one of ordinary skill in the art will recognize that various modifications and alternations will fall within the scope of the appended claims in light of the above teachings. It is, therefore, to be appreciated that the content of the disclosure may be practiced otherwise than as specifically disclosed within the scope of the appended claims. For this reason, the appended claims should be studied to determine the true scope and content.

What is claimed is:

1. An apparatus for guiding a maintenance individual to perform a safety checking operation on a functional component of an elevator system, comprising:
   a wireless signal component connected with an elevator controller of the elevator system and establishing a wireless communication connection with a mobile terminal carried by the maintenance individual to enter an elevator hoistway for maintenance operation by broadcasting a wireless signal;
   wherein the apparatus is configured to perform an information interaction about the functional component by a wireless communication module of the mobile terminal and the elevator controller, and to provide safety checking guidance information for guiding the maintenance individual to complete the safety checking operation by a safety checking guidance module of the mobile terminal, wherein the safety checking guidance information provided includes first safety checking guidance information and second safety checking guidance information;
   the elevator controller comprising: an information acquisition module for acquiring, in response to a state switching operation on the functional component, first information for determining whether the functional component passes a corresponding safety checking operation in real time;
   the apparatus is further configured to perform the following actions by the safety checking guidance module of the mobile terminal:
   generating first safety checking guidance information for guiding the maintenance individual to perform the state switching operation on the functional component, and
   generating, based on the first information, second safety checking guidance information indicating whether the functional component passes the safety checking operation;
   the information interaction including an interaction of the first information.

2. The apparatus of claim 1, wherein the elevator controller is configured to, in response to a first instruction transmitted from the mobile terminal, control a car to move to a position suitable for the maintenance individual to enter a pit of the elevator hoistway or to enter a car roof of the car.

3. The apparatus of claim 1, wherein the elevator controller is configured to operate in a hoistway maintenance control mode in response to a second instruction transmitted from the mobile terminal;
   wherein the elevator controller at least does not respond to a passenger's calling instruction in the hoistway maintenance control mode and can acquire the first information in real time.

4. The apparatus of claim 1, wherein the apparatus is configured to present the safety checking guidance information to the maintenance individual in the form of a sound and/or a user interface by an information presentation module of the mobile terminal.

5. The apparatus of claim 1, further comprising:
   a safety checking determination sub-module disposed in the elevator controller or the mobile terminal for determining, based on the first information, whether a corresponding functional component passes the safety checking operation, wherein the first information includes a current state of the functional component and position change information corresponding to a car in the current state.

6. The apparatus of claim 1, wherein the apparatus is further configured to: with determining that currently the functional component passes the safety checking operation, further provide safety checking guidance information for guiding the maintenance individual to complete the safety checking operation of yet another functional component using a safety checking guidance module of the mobile terminal based on a predefined safety checking operation procedure, if it is determined.

7. The apparatus of claim 1, wherein the maintenance operation comprises a maintenance operation performed on a car roof of the car, the functional components requiring the safety checking operation correspondingly include a door lock switch, a car roof e-stop switch, and/or a car roof inspection switch;

accordingly, the safety checking guidance information provided includes:
  information for guiding the maintenance individual to complete the safety checking operation for the door lock switch,
  information for guiding the maintenance individual to complete the safety checking operation for the car roof e-stop switch, and/or
  information for guiding the maintenance individual to complete the safety checking operation for the car roof inspection switch.

8. The apparatus of claim 1, wherein the maintenance operation comprises a maintenance operation performed in the pit of the elevator hoistway, the functional components requiring the safety checking operation correspondingly include a door lock switch, an upper e-stop switch disposed at the pit, and/or a lower e-stop switch disposed at the pit;
  accordingly, the safety checking guidance information provided includes:
  information for guiding the maintenance individual to complete the safety checking operation for the door lock switch,
  information for guiding the maintenance individual to complete the safety checking operation for the upper e-stop switch, and/or
  information for guiding the maintenance individual to complete the safety checking operation for the lower e-stop switch.

9. The apparatus of claim 1, wherein the wireless signal component is a Bluetooth module or a Bluetooth Low Energy module.

10. The apparatus of claim 1, wherein the apparatus is further configured to comprise: an electronic safety control module that automatically completes the state switching operation on the functional component currently under a safety checking in response to the first safety checking guidance information.

11. The apparatus of claim 1, further comprising:
  a wireless communication module of the mobile terminal for establishing the wireless communication connection with the wireless signal component, and performing the information interaction about the function component with the elevator controller.

12. An elevator system comprising a car and an elevator controller for controlling the car to move in an elevator hoistway, further comprising:
  an apparatus for guiding a maintenance individual to perform a safety checking operation on a functional component of an elevator system according to claim 1.

13. A method for guiding a maintenance individual to perform a safety checking operation on a functional component of an elevator system, comprising:
  establishing, by an elevator controller, a communication connection with a mobile terminal carried by the maintenance individual to enter an elevator hoistway for a maintenance operation by means of a wireless signal component in the elevator system;
  performing an information interaction about the functional component between the mobile terminal and the elevator controller; and
  providing, by means of the mobile terminal, safety checking guidance information for guiding the maintenance individual to complete the safety checking operation;
  acquiring, by the elevator controller in real time, first information for determining whether the functional component passes a corresponding safety checking operation in response to a state switching operation on the functional component;
  the providing safety checking guidance information includes:
  generating, by means of the mobile terminal, first safety checking guiding information for guiding the maintenance individual to perform the state switching operation on the functional component; and
  generating, by means of the mobile terminal based on the first information, second safety checking guidance information for determining whether the functional component passes the safety checking operation;
  wherein the safety checking guidance information provided includes the first safety checking guidance information and the second safety checking guidance information, the information interaction including an interaction of the first information.

14. The method of claim 13, further comprising:
  controlling the car to move to a position suitable for the maintaining individual to enter a pit of the elevator hoistway or to enter a car roof of the car in response to the first instruction transmitted from the mobile terminal.

15. The method of claim 13, further comprising:
  with determining that currently the functional component passes the safety checking operation, further providing safety checking guidance information for guiding the maintenance individual to complete the safety checking operation of yet another functional component by means of the mobile terminal based on a predefined safety checking operation procedure.

16. The method of claim 13, further comprising:
  automatically completing, by an electronic safety control module, a state switching operation on the functional component currently under a safety checking in response to the first safety checking guidance information.

17. A method for guiding a maintenance individual to perform a safety checking operation on a functional component of an elevator system, comprising:
  establishing a wireless communication connection with a wireless signal component connected with an elevator controller of the elevator system, and performing an information interaction about the functional component with the elevator controller; and
  providing safety checking guidance information for guiding the maintenance individual to complete the safety checking operation;
  wherein the providing the safety checking guidance information comprises generating first safety checking guiding information for guiding the maintenance individual to perform the state switching operation on the functional component;
  receiving first information from the elevator controller for determining whether the functional component passes a corresponding safety checking operation;
  the providing the safety checking guidance information further comprises:
  generating, based on the first information, second safety checking guidance information indicating whether the functional component passes the safety checking operation;
  wherein the safety checking guidance information provided includes the first safety checking guidance information and the second safety checking guidance information;

the information interaction including an interaction of the first information.

18. The method of claim 17, further comprising:
transmitting a first instruction to the elevator controller, wherein the first instruction is used for triggering the elevator controller to control the car to move to a position suitable for the maintenance individual to enter a pit of the elevator hoistway or to enter a car roof of the car.

19. The method of claim 17, further comprising:
presenting the safety checking guidance information in the form of a sound and/or a user interface.

20. The method of claim 17, further comprising:
transmitting, to the elevator controller, a second instruction to trigger the elevator controller to enter or exit a hoistway maintenance control mode in response to an input of the maintenance individual;
wherein the elevator controller at least does not respond to the passenger's calling instruction in a hoistway maintenance control mode and can acquire first information for determining whether the functional component passes a checking of a corresponding safety check in real time.

21. The method of claim 17, further comprising:
determining whether a corresponding functional component passes a safety checking operation based on the first information, wherein the first information includes a current state of the functional component and position change information corresponding to a car in the current state.

22. The method of claim 17, further comprising:
with determining that the functional component passes the safety checking operation, further providing, based on a predefined safety checking operation procedure, safety checking guidance information for guiding the maintenance individual to complete the safety checking operation of yet another functional component.

23. The method of claim 17, wherein a maintenance operation of the maintenance individual comprises the maintenance operation performed on a car roof of the car, the functional components requiring the safety checking operation correspondingly include a door lock switch, a car roof e-stop switch, and/or a car roof inspection switch;
accordingly, the safety checking guidance information provided includes:
information for guiding the maintenance individual to complete the safety checking operation for the door lock switch,
information for guiding the maintenance individual to complete the safety checking operation for the car roof e-stop switch, and/or
information for guiding the maintenance individual to complete the safety checking operation for the car roof inspection switch.

24. The method of claim 17, wherein a maintenance operation of the maintenance individual comprises the maintenance operation performed in a pit of an elevator hoistway, the functional components requiring the safety checking operation correspondingly include a door lock switch, an upper e-stop switch disposed at the pit, and/or a lower e-stop switch disposed at the pit;
accordingly, the safety checking guidance information provided includes:
information for guiding the maintenance individual to complete the safety checking operation for the door lock switch,
information for guiding the maintenance individual to complete the safety checking operation for the upper e-stop switch, and/or
information for guiding the maintenance individual to complete the safety checking operation for the lower e-stop switch.

25. The method of claim 17, wherein the established wireless communication connection is a Bluetooth connection or a Bluetooth Low Energy connection.

26. A non-transitory computer readable storage medium having stored thereon a computer program, wherein the program is executed by a processor to implement a method for guiding a maintenance individual to perform a safety checking operation on a functional component of an elevator system according to claim 17.

27. A mobile terminal for guiding a maintenance individual to perform a safety checking operation on a functional component of an elevator system, comprising a memory, a processor, and a computer program stored on the memory and executable on the processor, wherein when the program is executed by the processor, a method for guiding a maintenance individual to perform a safety checking operation on a functional component of an elevator system according to claim 17 is implemented.

* * * * *